Nov. 23, 1965   R. P. HAWKINSON   3,218,721
MEASURING GAUGE FOR BUFFING MACHINES
Filed July 16, 1963   2 Sheets-Sheet 1
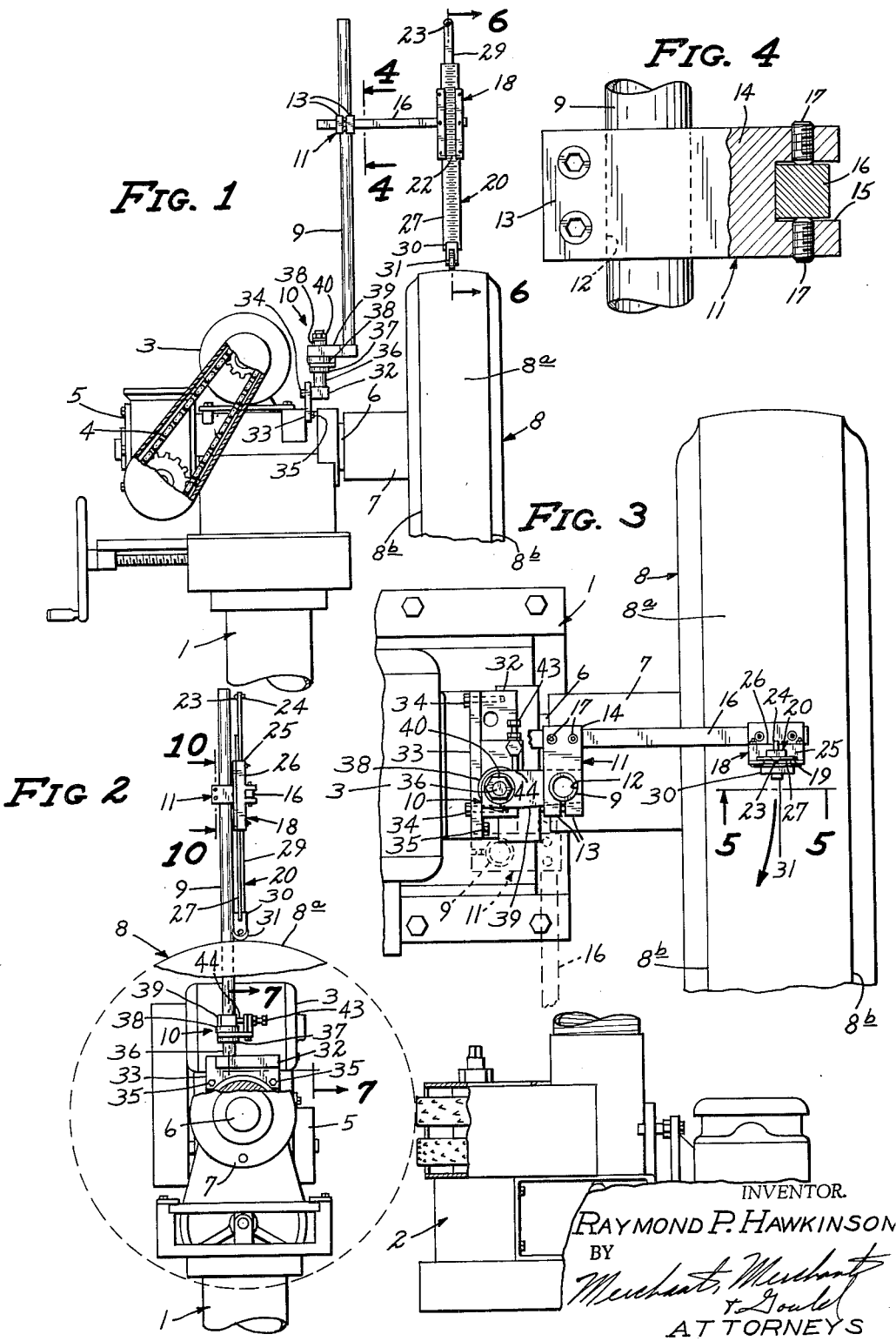
INVENTOR.
RAYMOND P. HAWKINSON
BY
ATTORNEYS Nov. 23, 1965    R. P. HAWKINSON    3,218,721
MEASURING GAUGE FOR BUFFING MACHINES
Filed July 16, 1963    2 Sheets-Sheet 2
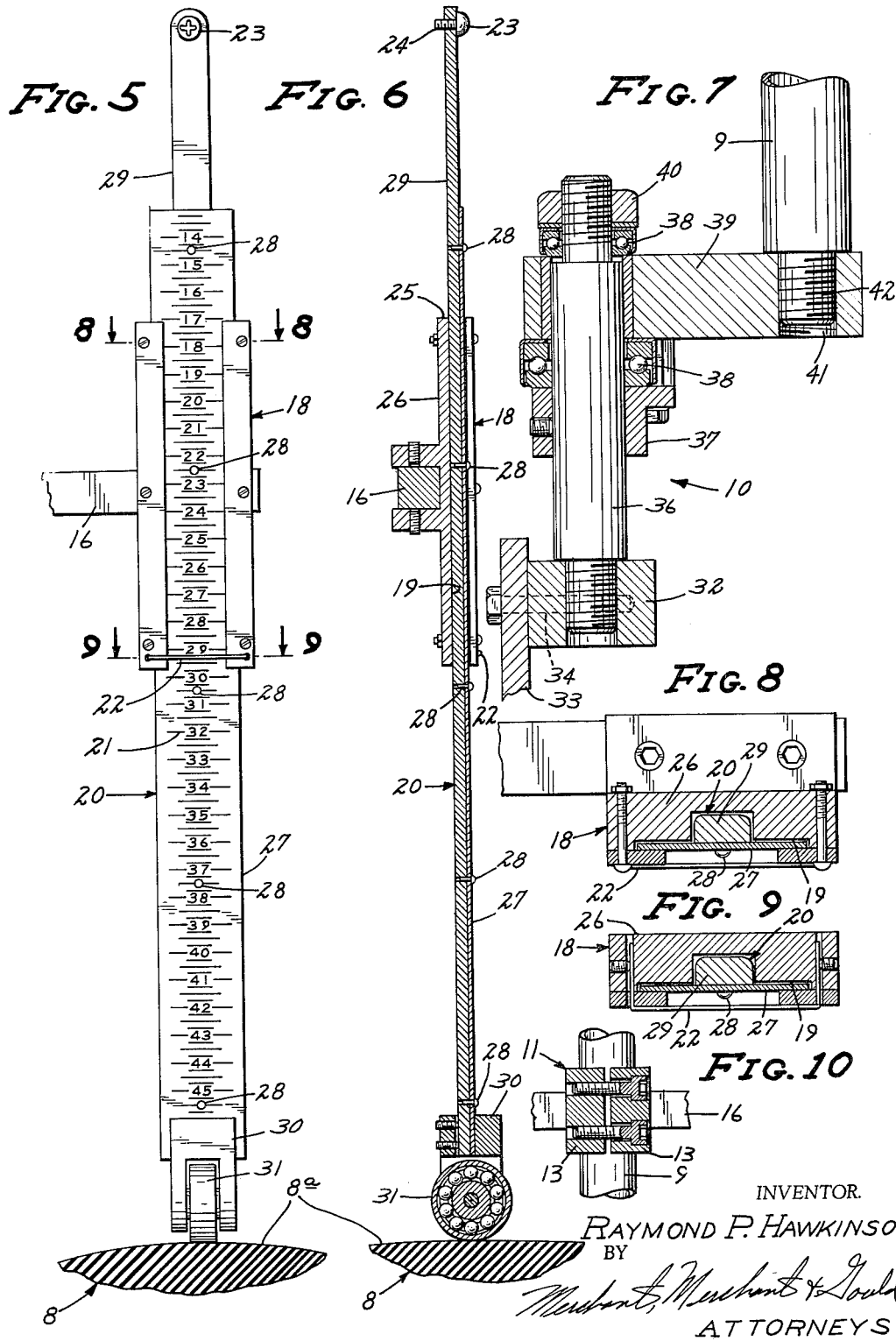
INVENTOR.
RAYMOND P. HAWKINSON
BY
ATTORNEYS United States Patent Office 3,218,721
Patented Nov. 23, 1965

3,218,721
MEASURING GAUGE FOR BUFFING MACHINES
Raymond P. Hawkinson, Minneapolis, Minn., assignor to Paul E. Hawkinson Company, Minneapolis, Minn., a corporation of Minnesota
Filed July 16, 1963, Ser. No. 295,358
1 Claim. (Cl. 33—169)

My invention relates to attachments for precision tire buffing and truing machines and has for its primary object the provision of a novel measuring gauge which is constantly in contact with the peripheral surface of a tire casing being buffed so as to make it possible at all times for the operator to know the precise diameter and trueness of such a tire casing.

A further object of my invention is the provision of a device of the class described which may be readily placed into and swung out of operative position wherein it overlies a tire casing being buffed.

A still further object of my invention is the provision of a device of the class immediately above described wherein a graduated gauging leg is fed into engagement with the peripheral surface of the tire casing under the action of gravity and thus is free to ride up and down within its guideway during rotation of the tire.

A further object of my invention is the provision of a device of the class above described which may be readily adapted for use in gauging tires, of different overall and cross-sectional diameters.

A still further object of my invention is the provision of a device of the class described which incorporates but a minimum of working parts, is durable, relatively inexpensive to produce, and is substantially foolproof in its operation.

The above and still further objects of my invention will become apparent from the following detailed specification, appended claim and attached drawings.

Referring to the drawings, wherein like characters indicate like parts throughout the several views:

FIG. 1 is a fragmentary view in side elevation of a precision buffing and truing machine showing my novel measuring gauge attached thereto;

FIG. 2 is a fragmentary view in end elevation of a conventional tire buffing machine showing my novel device mounted thereon;

FIG. 3 is an enlarged fragmentary view in top plan of the structure shown in FIG. 1;

FIG. 4 is a greatly enlarged view in vertical section as seen from the line 4—4 of FIG. 1;

FIG. 5 is a greatly enlarged view in vertical section as seen from the line 5—5 of FIG. 3;

FIG. 6 is a greatly enlarged view in vertical section as seen from the line 6—6 of FIG. 1;

FIG. 7 is a greatly enlarged view in vertical section as seen from the line 7—7 of FIG. 2;

FIG. 8 is a greatly enlarged view in horizontal section as seen from the line 8—8 of FIG. 5;

FIG. 9 is a greatly enlarged view in horizontal section as seen from the line 9—9 of FIG. 5; and FIG. 10 is a greatly enlarged view in vertical section as seen from the line 10—10 of FIG. 2.

Referring with greater particularity to the drawings, the numeral 1 indicates a pedestal of the type generally illustrated in Patent #2,965,162 and which, as shown in said patent, is associated with a base upon which is also rigidly mounted an upstanding buffing head, identified in its entirety here by the numeral 2. Carried by the upper end portion of the pedestal 1 is a suitable electric motor 3 having drive mechanism 4 interposed therebetween and a gear reduction unit 5. Projecting laterally outwardly from the gear reduction unit 5 is a horizontally disposed rotary shaft 6 upon which is mounted fast for rotation a hub 7 for demountable reception of an inflatable pneumatic tire casing 8. The crown portion of the tire casing 8, which is adapted to be buffed or otherwise treated by the buffing head 2, is identified by 8a.

My novel gauging attachment comprises an upstanding post 9 which is secured at its lower end to the pedestal 1 through the medium of a mounting bracket 10. It will be noted that the post 9 is in laterally spaced relation to the tire casing 8 generally in a vertical plane intercepting the axis thereof.

Post 9 is generally cylindrical in cross-section, as shown in FIG. 3, and has received thereover for compound rotary and sliding movements a clamping member 11 which is formed to define a cylindrical portion 12 for the slidable reception of the post 9 and a pair of set-screw-equipped jaws 13. Projecting laterally outwardly in the opposite direction from the jaws 13 is a tongue 14 which is bifurcated at its outer end, as at 15, for the slidable reception of one end of a horizontally disposed arm 16. Opposed set-screws 17 are provided for locking the arm 16 in the desired adjusted position along its longitudinal axis. At its outer end the arm 16 is formed to define a longitudinally extended guide 18, the channel-shaped guideway of which is identified by 19. Slidably mounted in the guideway 19 of the guide 18 is a longitudinally extended leg 20 having progressive graduations 21 thereon which cooperate with a suitable indicator member 22 carried by the guide 18. At its extreme upper end the leg 20 is provided with a stop member 23 which limits downward movement of the leg 20 within the guideway 19 by engagement of the extended end 24 thereof with the top edge 25 of the rear wall 26 of guide 18.

While the particular form of the gauging leg 20 forms no part of the instant invention, as shown, the graduated portion is in the nature of an elongated strip 27 which may be suitably secured, as by rivets 28, to a relatively rigid backing member 29 which, as shown particularly in FIG. 6, is provided with a bifurcated shoe 30 at its lower end for the rotative reception of a suitable roller element 31.

With respect to the mounting bracket 10, it will be observed that same includes a base 32 suitably secured to a vertically extended mounting plate 33, as indicated at 34. The lower end of the mounting plate 33 is, in turn, rigidly secured to the upper end of the pedestal 1 by any suitable means such as a bolt 35. Screw-threaded into the base 32 and upstanding therefrom is a stub-shaft 36 on the intermediate portion of which is a lock collar 37. Supported on the lock collar 37 in encompassing relationship with the shaft 36 are a pair of suitable thrust bearings 38 between which is a crankarm 39. A lock nut 40 maintains the elements 38, 39 in desired position upon the lock collar. As shown, the radially outer end of the crankarm 39 is formed to define a threaded aperture 41 for the reception of the screw-threaded diametrically reduced lower end portion 42 of the post 9.

*Operation*

When a tire casing 8 has been inflated and suitably mounted on the hub 7, my novel gauging device is moved from the dotted line inoperative position of FIG. 3 to the operative full-line position thereof, wherein the roller element 31 is in engagement with the crown 8a of the tire casing 8 centrally of the shoulders 8b. Obviously with tires of different overall and transverse diameters it may be necessary to adjust the arm 16 within the clamping member 11 and the crankarm 39 about the stub-shaft 36. In any event the leg 20 will be gravity biased toward engagement of the roller 31 with the crown 8a and will be so disposed that the horizontal axis of said roller element 31 is parallel to the axis of the shaft 6. For the purpose of preventing the arm 16 from going beyond its operative full-line position of FIG. 3, I provide a suitable adjustable stop member 43, the extended end 44 of which engages the side of the crankarm 39. With this arrangement, it is obviously possible for the operator to be fully apprised at all times of the true roundness of the tire casing 8 being buffed, as well as the overall diameter thereof. When the desired buffed diameter has been reached the entire gauging apparatus may be swung to its inoperative position wherein the gauging arm is moved laterally of the tire casing 8.

My invention has been thoroughly tested and found to be completely satisfactory for the accomplishment of the above objects, and while I have shown a preferred embodiment thereof, I wish it to be understood that same may be capable of modification without departure from the scope and spirit of the appended claim.

What is claimed is:

In a tire buffing and truing machine,
- (a) a pedestal,
- (b) means on said pedestal for mounting an inflated pneumatic tire casing for rotation about a horizontal axis,
- (c) power means for imparting rotation to said first-mentioned means,
- (cc) a crank arm mounted at one end thereof on said pedestal for limited swinging movement about a vertical axis,
- (d) a post carried by the other end of said crank arm and projecting upwardly therefrom in laterally spaced relation to said tire casing,
- (e) a horizontally disposed arm,
- (f) means securing one end of said horizontally disposed arm to said post for compound rotary swinging movements about the axis of said post and vertical sliding movements toward and away from the crown portion of said tire casing,
- (g) the other end of said horizontally disposed arm defining a guideway the longitudinal axis of which is laterally spaced from said post and lies in a vertical plane which is parallel to the axis of said post,
- (h) a leg mounted for sliding movements in said guideway, and
- (i) a roller element on the lower end of said leg and adapted to engage the crown portion of said tire casing under the action of gravity when said guideway and leg are moved to a vertically disposed position overlying same,
- (j) said leg having graduations thereon which cooperate with the means on said guideway to constantly indicate the radius and trueness of said tire casing as tread is being removed therefrom under rotation.

References Cited by the Examiner

UNITED STATES PATENTS

| 794,500 | 7/1905 | Hayes | 33—169 |
| 1,182,861 | 5/1916 | Spencer. | |
| 1,317,227 | 9/1919 | Scusa | 33—172 |
| 1,538,510 | 5/1925 | Bonk | 33—172 |
| 2,636,277 | 4/1953 | Hawkinson | 33—143 |

FOREIGN PATENTS

| 98,454 | 7/1897 | Germany. |
| 187,917 | 8/1907 | Germany. |
| 612,276 | 11/1948 | Great Britain. |

ISAAC LISANN, *Primary Examiner.*